Aug. 15, 1933.  D. SPRAGUE  1,922,220
HEATING AND VENTILATING APPARATUS
Filed July 1, 1931  3 Sheets-Sheet 1
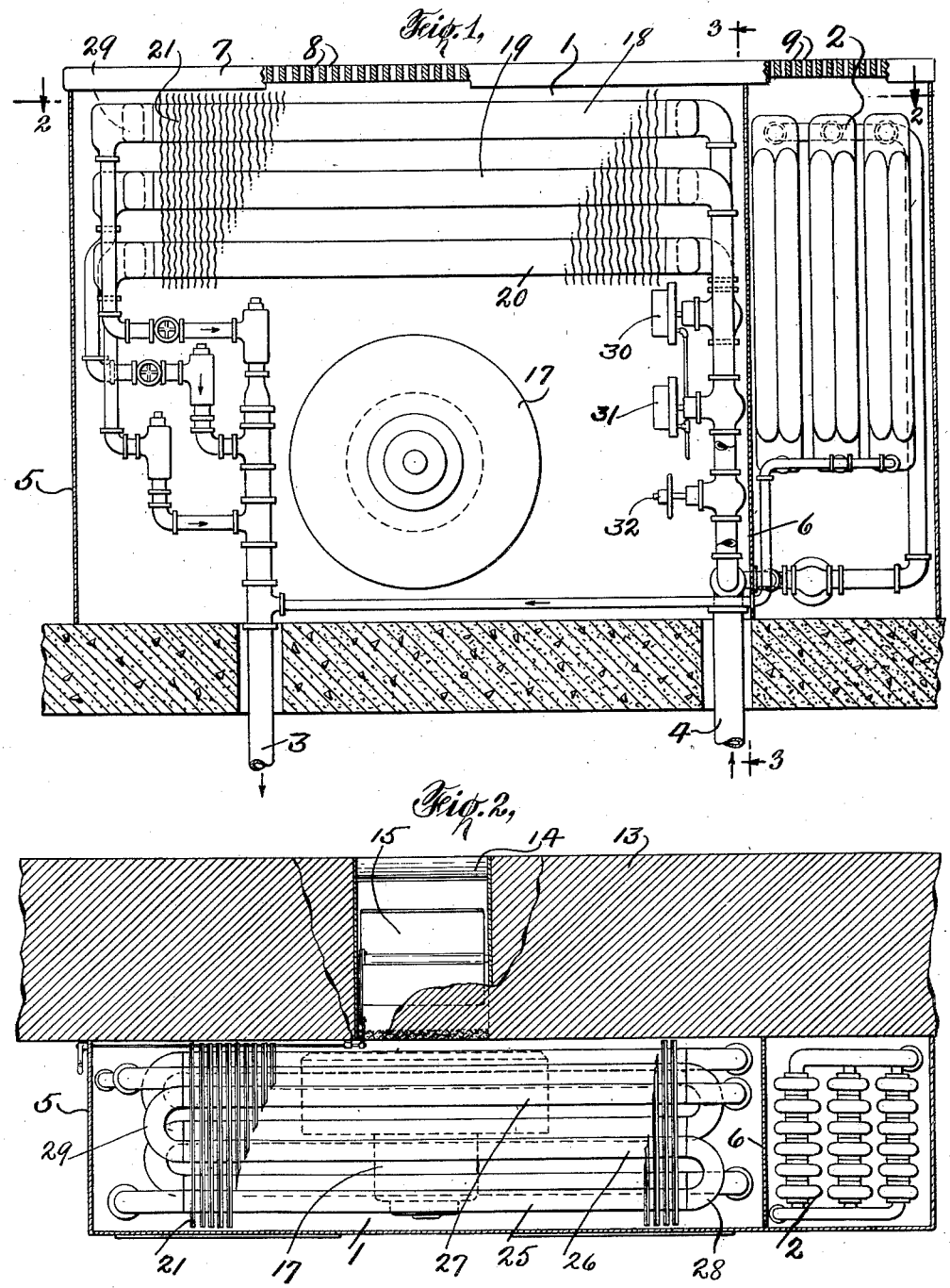

Aug. 15, 1933.　　　　D. SPRAGUE　　　　1,922,220
HEATING AND VENTILATING APPARATUS
Filed July 1, 1931　　　3 Sheets-Sheet 2
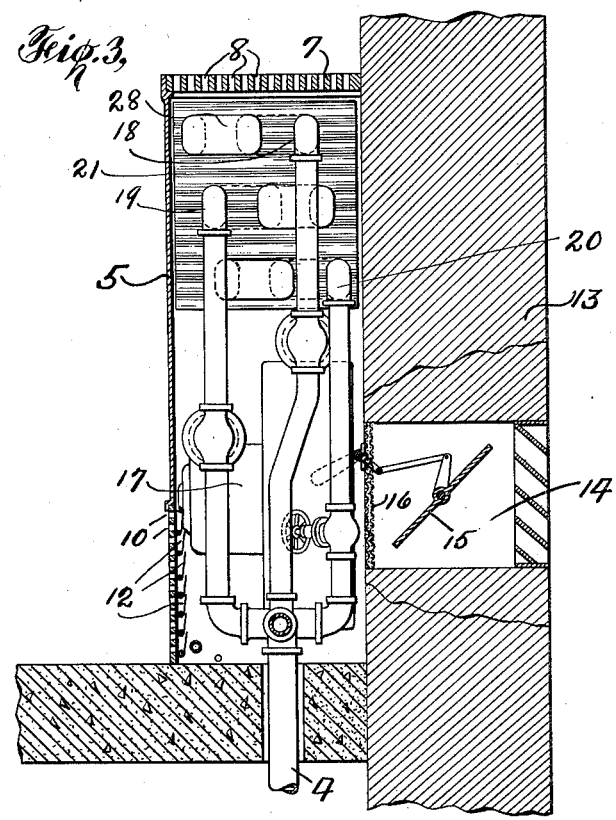
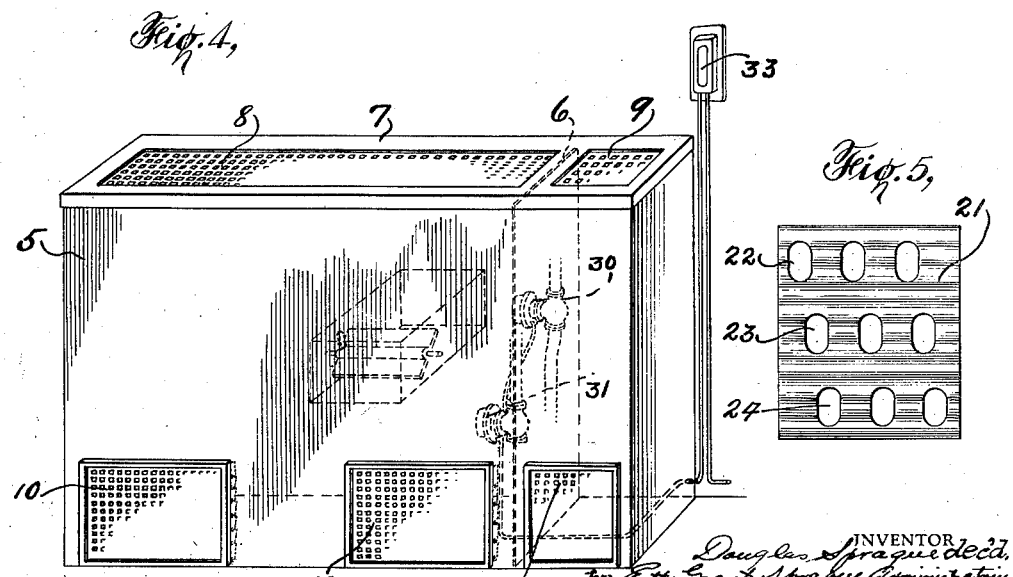

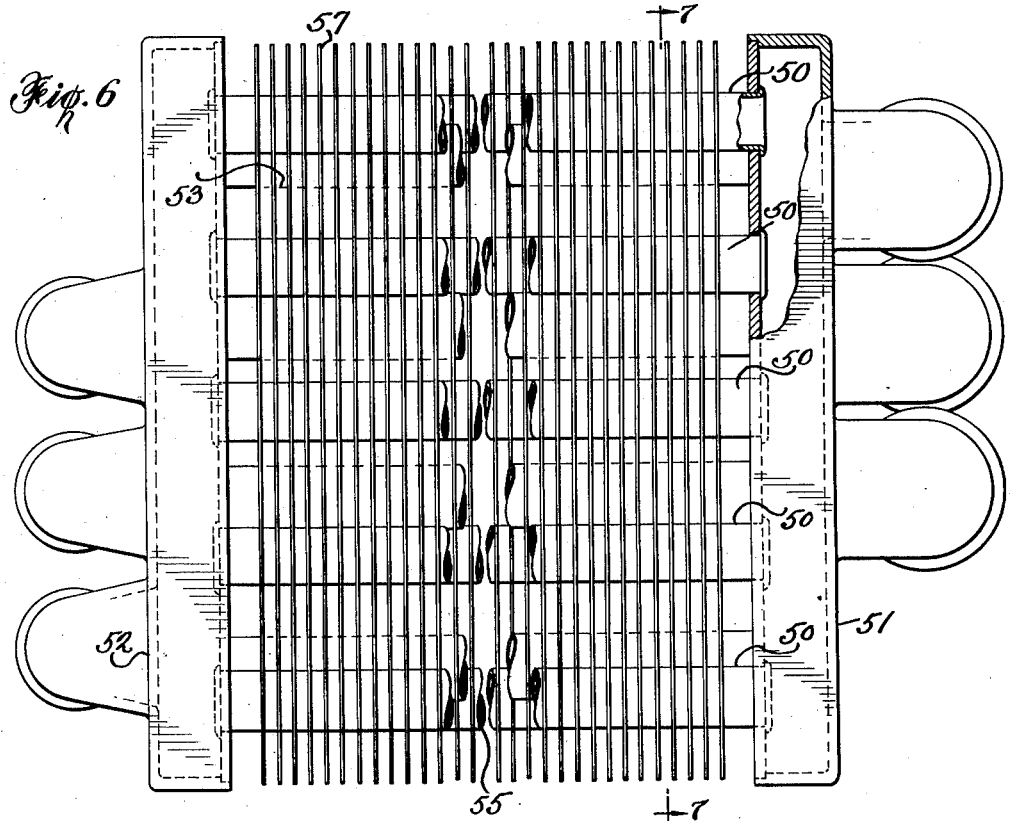
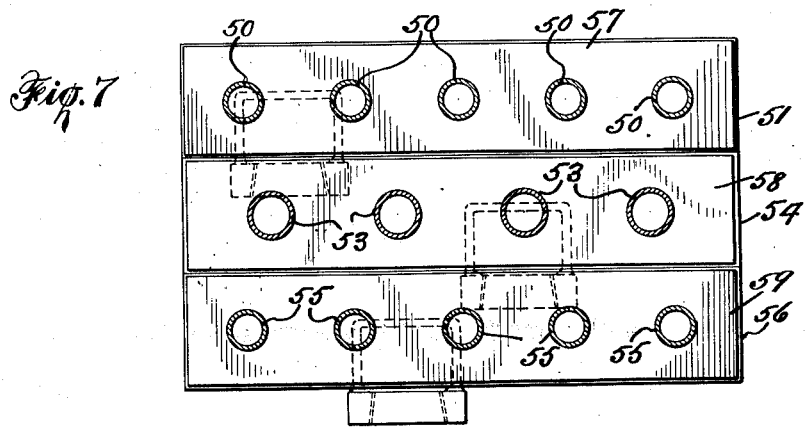
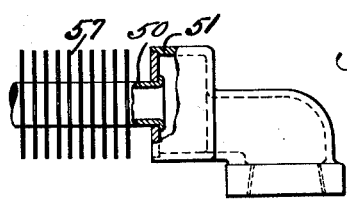

Patented Aug. 15, 1933

1,922,220

UNITED STATES PATENT OFFICE 1,922,220

HEATING AND VENTILATING APPARATUS

Douglas Sprague, deceased, late of Mount Vernon, N. Y., by Etta Grant Sprague, administratrix, Mount Vernon, N. Y Application July 1, 1931. Serial No. 548,102

10 Claims. (Cl. 257—137)

This invention relates to an improvement in heating and ventilating systems and embodies improved apparatus in which air from the outside is drawn into the apparatus, heated, and then discharged into a room.

Prior devices heretofore used employ a motor driven fan by which air is drawn into the apparatus through a filter, the air then being circulated or driven through a radiator, and finally discharged into the room which is to be heated.

Such devices also employ so called mixing dampers, i. e., devices by which the amount of air which is passed through the radiator may be varied. These dampers are intended to compensate for varying outside weather conditions. For example, when the outside temperature is low all of the air taken in by the fan will be passed through the radiator, while under milder conditions only part of the air is passed through the radiator, the balance being by-passed around the radiator.

It is the universal practice to also install a so-called direct radiator in the same room with the apparatus above referred to. Such radiator will be located some distance from the heating and ventilating unit, and be provided with its own set of risers, and its own thermostatic control if automatic control is employed.

It has been found in commercial practice that such systems have their limitations, which, however, have been overcome by the present invention. For example, the mixing dampers are objectionable in that they necessitate the use of narrow radiators, which increases the air travel and produces objectionable velocity noises.

The present invention provides an apparatus embodying a heating and ventilating section and a direct radiating section which are constructed and arranged to be connected to a single pair of risers and enclosed in the one cabinet together with all piping, fans, etc., and so constructed and arranged as to eliminate the use of mixing dampers and to be automatically controlled by a single room thermostat.

The present apparatus provides a construction in which the temperature of the air delivered to the room may readily be kept constant under varying outside weather conditions, and as mentioned above, without the use of mixing dampers.

The present invention further provides an apparatus in which the heating and ventilating section is composed of a plurality of coils constructed and arranged to be cut in and out of service automatically dependent upon outside temperature conditions.

In the drawings accompanying this application:

Fig. 1 is a view in front elevation of an installation embodying the present invention, the front of the cabinet within which the apparatus is enclosed having been removed;

Fig. 2 is a section taken along the line 2—2 of Fig. 1;

Fig. 3 is a section on the line 3—3 of Fig. 1;

Fig. 4 is a view in perspective showing the cabinet construction within which all of the equipment is enclosed;

Fig. 5 is a view in elevation of one of the fins employed in the radiator construction;

Fig. 6 is a plan view of a modified heating assembly;

Fig. 7 is a section on the line 7—7 of Fig. 6; and

Fig. 8 is a side fragmentary view of one tier of the modified heater of Fig. 6.

Referring to the drawings in detail, with reference to Figs. 1 to 5, inclusive, the present improved apparatus, as above briefly pointed out, provides a heating and ventilating section 1 and a cooperating direct radiating section 2. This is clearly shown in Figs. 1 and 2, from which figures it will be seen that the single set of risers 3 and 4 for these sections are connected thereto within the enclosing cabinet 5. This cabinet, as will be explained presently, as a matter of fact encloses the entire apparatus.

The heating and ventilating section 1 is divided from the direct radiating section 2 by a partition 6.

The upper wall 7 of the cabinet is provided with openings 8 above the section of the cabinet enclosing the heating and ventilating section, while that part of the cabinet containing the direct radiating section 2 is provided in its upper wall or top with openings 9. The front of the cabinet is provided with air intake openings 10 and 11. These openings are controlled by shutters 12 which for the purpose of this invention may be considered hand operated.

13 designates the outside wall of a room in which the apparatus is installed, and as will be seen from Fig. 3 this wall is provided with an opening 14 to the outside for the intake of fresh air. This opening is conveniently controlled by a damper 15, or automatically controlled, as desired.

16 designates a filter placed across the rear end of the air inlet opening 14.

Air is drawn into the cabinet through the intake opening 14 by a fan 17 also placed in the cabinet. This fan may be of usual construction and as the same does not constitute a part of the present invention will not be described in any detail. In any event, however, the fan is of such a character as to draw air through the opening 14 provided the damper 15 is in the position shown in Fig. 3, for example, and to discharge the same upwardly between the radiating pipes and their fins lying above the fan within the cabinet to heat the air, the air after passing between these pipes escaping into the room through the openings 8 already referred to in the top of the cabinet.

When it is desired to recirculate the air in the room it is merely necessary to close the fresh air damper 15 and to open the shutters 12 in the front of the cabinet, the fan 17 then drawing air into the cabinet through the openings 10, the air being passed by the fan upwardly between the pipes above the fan, thereafter escaping through the openings 8 at the top of the cabinet into the room, as will be understood.

All air circulated by the fan is passed through the radiator as distinguished from prior devices in which in operation some of the air is by-passed.

As so far described, therefore, the present apparatus comprises a direct radiator section 2 and a cooperating indirect radiating section 1 both connected to a single pair of risers 3 and 4, and all enclosed within a single cabinet, as distinguished from structures now existing in which the direct radiator is located at a point remote from the indirect radiating unit and connected to its own pair of risers.

The radiators comprising the indirect section of the present invention are of new construction in that the same comprise a series of coils which are designated 18, 19 and 20, all connected to the supply riser 4 and return riser 3. These coils are provided with radiating fins 21 common to all three sets. One of these fins is shown in Fig. 5, and the coils 18, for example, constituting one portion of the radiator are passed through the openings 22 in the fins, the coils 19 through the openings 23 and coils 20 through the opening 24.

As will be seen from Fig. 2 the coils 18 are made up of three pipes 25, 26 and 27 preferably shaped, in cross section, corresponding to the openings 22 in Fig. 5. One end of the pipe 25 is connected to the down riser 3, while the other end is connected to the pipe 26 by a union 28. The opposite end of this pipe 26 is connected to the end of the pipe 27 by a union 29, while the opposite end of the pipe 27 is connected to the supply riser 4. This is an inexpensive way of manufacturing and assembling the radiator unit, as it eliminates all bending, etc. of the pipes and permits of rapid application of the radiating fins.

The other coil sections 19 and 20 are similar in construction to coil section 18.

Each coil section is controlled by its own automatically operating valve. These valves are well known and purchasable in the open market. The coils 18 are controlled by a valve 30, coils 19 by a valve 31, while for convenience coils 20 may be controlled by a hand valve 32 or by an automatic valve as desired.

The valves 30 and 31 and if desired the valve 32 are thermostatically controlled from a room thermostat 33, and owing to the fact that the indirect radiating section is made up of three separately controlled sections it will be obvious that the single thermostat 33 will be ample for proper temperature regulation of the air to be heated.

As pointed out above in connection with the brief description of this invention, it is necessary in present systems to provide mixing dampers to in a measure compensate for varying weather conditions, these dampers being placed above the fan 17 and so constructed and arranged that by adjusting the same the amount of air which is passed between the radiating pipes and fins may be varied. In other words, by adjusting these mixing dampers a portion only of the air taken into the system is passed through the radiator while the remainder of the air is by-passed around it. This arrangement, however, will not take care of extreme weather conditions with the result that it is often necessary to shut off the fresh air intake entirely and merely recirculate the air within the room through the opening within the front of the cabinet. It will be obvious, however, that by the present arrangement, i. e., splitting the indirect heating radiating section of the apparatus into a plurality of cooperating sections, three in the present instance, much more flexibility is obtained so that if desired the fresh air intake may be kept open at all times and in any event all the air circulated is passed through the radiator, while maintaining a constant room temperature, these results being obtainable without the use of mixing dampers. This will be further appreciated if it be borne in mind that each coil section of the radiator has its own control, although but a single master thermostat is necessary. It might be added further that in very cold weather it may be necessary to maintain all three sections of the radiator, and the direct radiator in operation, while under milder outside weather conditions two or possibly one radiator section would suffice, all taken care of automatically by the room thermostat 33.

It will be appreciated also from the foregoing that by enclosing the direct radiator section within the same cabinet enclosing the heat and ventilating section and by connecting both sections to the same risers a saving in space is effected to say nothing of the improved appearance of the room equipped with this apparatus.

As said before it is customary at the present time to provide a heating and ventilating unit at one part of the room and a direct radiator in another part, necessitating the provision of two thermostats if automatic control is desired, whereas by the present arrangement a single thermostat is all that is necessary, while the room so far as appearance is concerned is greatly improved.

It will be obvious also that by separating the indirect radiating section, that is to say, the heating and ventilating section into a plurality of parts or sections that a much more flexible control is obtained than possible with such structures as heretofore constructed.

In the modification shown in Figs. 6, 7 and 8, certain changes have been made in the construction of the heating coils.

An inspection of these figures of the drawings will show that this embodiment of the invention provides three tiers of coils, an upper tier, an intermediate tier and a lower tier. The upper tier comprises pipes 50, extending parallel to each other and opening at each end into headers 51 and 52. The intermediate tier comprises parallel pipes 53, opening into a header 54 at each end of these pipes. The lower tier comprises pipes 55 opening into headers 56. It will be understood that all three tiers will be connected to risers similar to the construction of Fig. 1. It will be appreciated also that the unions 28 and 29 shown in Fig. 2 have been eliminated and the headers above referred to substituted.

The pipes 50 of the upper tier are provided with fins 57 common to all the pipes of the tier. Likewise the pipes 53 and 55 of the intermediate and lower tiers are provided with fins 58 and 59, respectively, fins 58 being common to the pipes of the intermediate tier, and fins 59 to the pipes of the lower tier.

What is claimed is:

1. Heating apparatus comprising a heating and ventilating section, a cooperating direct radiator section, and a single pair of risers for both sections, and a control for the heating and ventilating section independent of the direct radiator section.

2. Heating apparatus comprising a heating and ventilating section, a cooperating direct radiator section adjacent the first-mentioned section, a single pair of risers for both sections, and valve controlled means for separately and independently connecting said sections to said risers.

3. Heating apparatus comprising a heating and ventilating section, a cooperating direct radiator section adjacent the first-mentioned section, risers for said sections, valves for said sections, a circulating fan cooperating with the heating and ventilating section, and a cabinet for enclosing all of said apparatus.

4. Heating apparatus comprising a heating and ventilating unit composed of a plurality of coils served by a single set of risers, and means for automatically controlling each of said coils independently.

5. Heating apparatus comprising a heating and ventilating unit composed of a plurality of coils served by a single set of risers, and temperature controlled valves for the independent control of said coils.

6. Heating apparatus comprising a heating and ventilating unit provided with an air intake, a circulating fan, said fan, intake and unit being so disposed that all air drawn into the apparatus must circulate through the unit.

7. Heating apparatus comprising a plurality of independently controlled coils, a single set of risers to which said coils are connected, and a single thermostat for controlling said coils independently.

8. Heating apparatus comprising a plurality of independently controlled coils, a single pair of risers serving said coils, a fan for circulating air about said coils, valves for the independent control of each coil, an enclosing cabinet and a single thermostat outside the cabinet for the independent control of said valves.

9. Heating apparatus comprising a heating and ventilating unit composed of a plurality of sets of heating coils, and a valve controlled by the temperature of the space to be heated for controlling each set of coils.

10. Heating apparatus comprising in combination a plurality of superposed tiers of heating pipes, each tier composed of a plurality of pipes, the pipes of each tier being arranged in staggered relation to the pipes of the adjacent tier, separate headers for each tier, fins common to the pipes of each tier and separate from the pipes of the other tiers.

ETTA GRANT SPRAGUE.
*Administratrix of the estate of Douglas Sprague, deceased.*